May 31, 1927.
F. PORSCHE
1,630,634
COUPLING DEVICE FOR BLOWERS OF COMBUSTION MACHINES
Original Filed Jan. 14, 1925
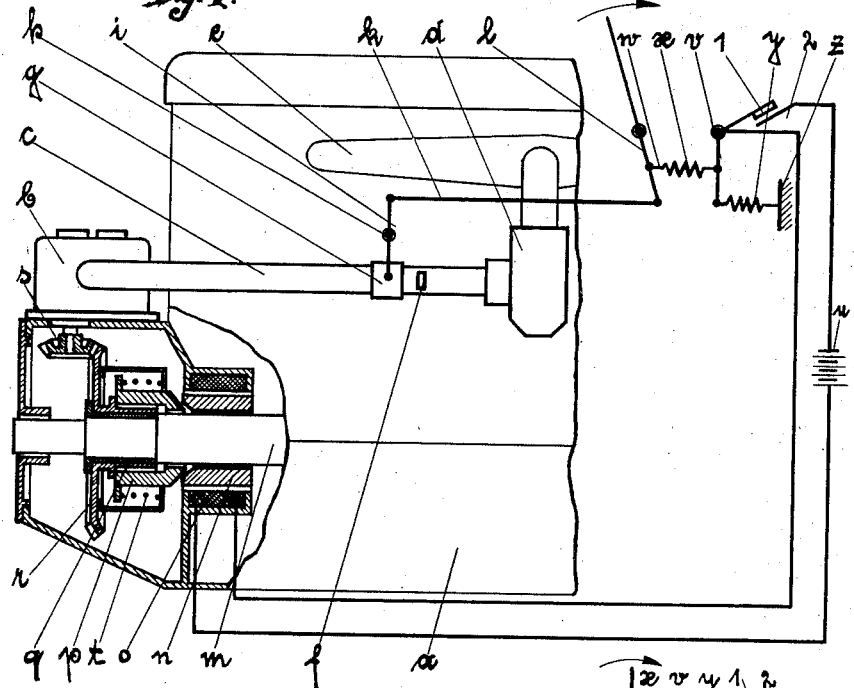
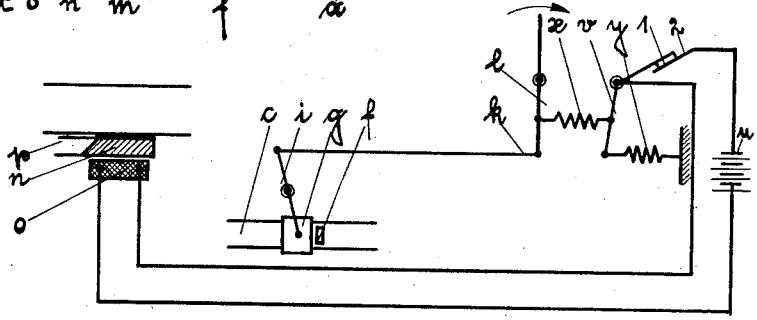
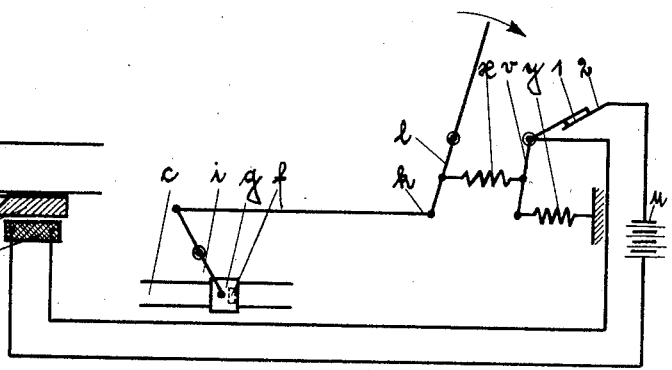
Witnesses:
W. G. Tzeren.
Inventor:
by his Attorney Patented May 31, 1927.

1,630,634

UNITED STATES PATENT OFFICE.

FERDINAND PORSCHE, OF STUTTGART-UNTERTURKHEIM, GERMANY, ASSIGNOR TO DAIMLER-MOTOREN-GESELLSCHAFT, OF WURTTEMBERG, GERMANY, A CORPORATION OF GERMANY.

COUPLING DEVICE FOR BLOWERS OF COMBUSTION MACHINES.

Application filed January 14, 1925, Serial No. 2,457, and in Germany September 3, 1923. Renewed May 19, 1926.

In internal combustion engines, especially for power-driven vehicles it is known to employ blowers or compressors in order to introduce the charge at a pressure, which is higher than atmospheric, into the cylinders for the purpose of increasing the output of the machine.

The conditions of the country and of the road permit in most cases only a temporary employment of the blower. For this reason the blower is driven by a coupling, which during the operation of the machine is switched in and out of working condition.

Heretofore, for this purpose there have been employed friction couplings of different kinds, which are made to operate by the pressure exerted by the driver, such as for instance plate-couplings and conical couplings. The operation of the coupling and the amount of the coupling-pressure in couplings operated in this manner are therefore mostly dependent upon the ability of the driver and it will therefore eventually happen, that the coupling will only be incompletely put into and out of operation. This causes certain disadvantages which are connected with the operation of the coupling and the coupling itself.

In order to obtain a quick acceleration of the vehicle, it will be necessary to completely put the blower into operation and on account of the conditions of the road and other circumstances it will be necessary to quickly put the blower out of operation.

In friction-couplings, which have so far been employed for the drive of the blower, for the reasons stated, there will, however, be no assurance, that the coupling will always be completely put into and out of operation.

In case of plate-couplings, also, when being incompletely coupled and uncoupled, a corrosion or grooving of the plates will take place.

The object of this invention is to do away with these disadvantages. This invention consists in employing a magneto-electric coupling which is kept in coupling condition by the action of the magneto-electric field. Couplings of this kind can always be properly operated by opening and closing a contact without requiring special attention of the driver. The dispensing with the operating mechanism for the coupling in case of magneto-electric couplings will further essentially contribute to the degree of safety of operation, because troubles may occur for instance, by a deformation of the operating mechanism for the coupling.

In order to avoid an interruption of the air-supply, during switching in and out of the coupling, according to this invention there is provided an arrangement, whereby the coupling is thrown in shortly before closing the interruption inserted, for instance, into the connecting conduit between the vaporizer and the blower, and thrown out shortly after opening this interruption.

In order to obtain such an operation by a common valve, there is inserted, for instance, a spring into the operating mechanism, which connects the contact with the switching organ, said spring being lengthened after closing the contact during the further adjustment of the switching organ for closing the interruption. When throwing out the coupling, whereby first the interruption is opened, the previously lengthened spring will contract and the contact is then broken by the spring of an instantaneously acting switch.

The switching in and out of the blower can also be brought into dependence from the regulating mechanism for the vaporizer and more particularly in such a manner, that the switching of the blower will not commence before a certain degree of opening of the regulator.

In the accompanying drawing there is shown an example of carrying this invention into effect.

Figure 1 is a diagrammatic view, partly in section, of an internal combustion engine having a fan or blower operated by means of a clutch which is actuated by electromagnetic means. Fig. 2 represents diagrammatically the operating mechanism with switch and closing organ, which is arranged in the pressure conduit of the blower. The switching lever and the adjoining parts are in the position as shown, if the switch is thrown in from the inoperative condition of the switch, according to Fig. 1, while the closing organ has only performed one half of its motion for closing the opening in the pressure conduit. Fig. 3 shows the same diagram as Fig. 2, having, however, the several parts in the condition, in which the switch for the electric coupling is thrown in and the closing organ in the pressure conduit closes the channel in the latter.

The combustion engine $a$, which, for instance, may be built into a power-driven vehicle, is provided with a blower $b$ of any kind. By means of the blower, for instance there are temporarily introduced the combustion air or the mixture through the conduit $c$, the vaporizer or carburetor $d$ and the conduit $e$ into the working cylinder of the machine.

In order to resiliently adapt the torque of the combustion machine to the changing resistance of the road, there is provided an arrangement, which enables the supplying to the combustion machine through the blower $b$ alternately combustion air at super-pressure or combustion air at atmospheric pressure.

For this purpose, there is provided, for instance, into the conduit $c$ an opening $f$, which is closed through the valve $g$, if the combustion air shall be introduced at super-pressure and which is opened if the combustion air shall be introduced at atmospheric pressure.

For adjusting the valve $g$, there is provided on the latter a lever $i$ which may be swung around the point $h$, said lever being connected through an operating rod $k$ with the switching lever $l$.

For driving the blower by the internal combustion engine $a$, there is, for instance, the iron ring $n$ of an electro-magnet with the coil $o$ provided upon the crank-shaft $m$. The iron ring $n$ is made on the one side, for instance, with a conical recess, which is disposed oppositely to the cone of an iron-ring $p$. The latter is mounted adjustably upon the hub $q$ of a cog-wheel $r$, by means of a tongue and groove construction. The cog-wheel $r$ is mounted rotatably upon the shaft $m$. With the cog-wheel $r$ meshes the cog-wheel $s$, which serves for driving the blower. There is further inserted a spring $t$, which keeps the iron core $p$ in thrown-out condition. The contact for closing and opening the circuit is constructed as follows:

The contact lever $v$ is connected with the hand-lever $l$ through an operating connection $w$, which includes a spring $x$, furthermore a spring $y$ is connected to the contact lever $v$, said spring $y$ being fastened on its other end to a relatively fixed part $z$.

The operation of the apparatus is in brief as follows:

In the position shown in Fig. 1, the port $f$ is open and the combustion machine will draw in air of atmospheric density. If thereupon the combustion air shall be introduced by the blower at super-pressure, the hand-lever $i$ is swung in the direction as shown by the arrow. If, however, the lever $l$ is thrown in the position as shown in Fig. 2, the contact 1, 2 is closed by reason of the tension of the spring $x$ which is due to the swinging of the lever $l$. By the closing of the contact the coil $o$ will be supplied with curent from the battery $u$ and the iron core will become magnetized. In consequence thereof it will attract the oppositely positioned iron ring $p$ and thereby throw in the coupling of the drive for the blower $b$. The blower hereupon supplies air under pressure into the conduit $c$, which, however, at first will not yet reach the working cylinders of the machine, because the port $f$ is still opened.

The latter is closed by swinging the lever $l$ into the position shown in Fig. 3. The motor will now obtain the combustion air at super-pressure through the blower. The coupling is thrown in before closing the port in order that no interruption in the supply of the combustion-air takes place. If the port $f$ were closed simultaneously with the throwing-in of the coupling, there might be the possibility, that until the full action of the blower takes place, an insufficient quantity of combustion-air would enter into the working cylinders of the engine.

For throwing-out the blower, the lever $l$ is brought back in opposite direction to that indicated by the arrow and shown in Fig. 3, into the position shown in Fig. 2. By this motion only the port $f$ will be opened, while the contact 1, 2 and therewith the coupling for the blower is still in operating condition. The air, which is conveyed by the blower will therefore partly flow through the port $f$ towards the atmosphere.

In order to throw-out the coupling for the blower, the lever $l$ must be brought back into the position shown in Fig. 1. The motor will then only draw in air at atmospheric pressure through the port $f$. The opening of the port $f$ and the subsequent throwing-out of the coupling for the blower has the effect of avoiding an interruption of the supply of air to the working cylinders of the machine.

It has been found in practice that by operating the lever $l$ under suitable driving conditions, between the range of full port opening and full port occlusion so as to vary the extent of opening of said port advantageous regulation of the mass of mixture taken into the engine may be obtained.

I claim:

1. In an internal combustion engine having a carburetor, an air inlet conduit connected to said carburetor and having an inlet opening therein normally communicating with the atmosphere, a movable valve adapted to control said inlet opening, a blower connected to said air inlet conduit and adapted to force air through it and through said carburetor, said blower being adapted to be connected to a driven member of said engine by means of a clutch embodying two relatively movable clutch members adapted to be moved into operative position and into inoperative position, said clutch members embodying cores capable of being magnetized, spring means adapted to normally separate said clutch members, a coil associated with one of said clutch members, a source of electric current, a switch embodying a switch lever and adapted to connect said coil to said source of current and to disconnect it therefrom, a spring associated with said switch lever and adapted to urge it into a position in which said switch lever is in the inoperative position, a control lever connected to said valve, and a lost-motion connection between said control lever and said switch lever, said lost-motion connection being adapted to urge said switch lever into the operative position when said control lever is actuated, before said valve is moved to close said inlet opening.

2. In an internal combustion engine, the combination of a working cylinder, a blower, a conduit, connecting the blower with the working cylinder for feeding a compressed charge to the working cylinder, an electromagnetic clutch, for coupling the blower with the motor crank-shaft, a device for regulating the mass of the mixture which is fed into the combustion chamber, and mechanism for the simultaneous operation of said clutch and said regulating device.

3. In an internal combustion engine having a working cylinder and a carburetor, the combination of a blower for supplying a charge to the working cylinder, a pressure conduit connecting said blower to said carburetor and provided with an air port, a driving connection between said blower and the engine, a magneto-electric clutch interposed in said driving connection, a valve for controlling the admission of air through the port in the conduit, and a lever mounted for movement in opposite directions pivotally connected to said valve, for operating the same and said lever controlling the energization of the electro-magnetic clutch.

4. In an internal combustion engine having a working cylinder and a carburetor, the combination of a blower for temporarily supplying a charge to the working cylinder, a pressure conduit connecting said blower to said carburetor and provided with an air port, a driving connection between said blower and the engine, a magneto-electric clutch interposed in said driving connection, a pair of electrical contacts for controlling said clutch, a valve for controlling the admission of air through the port in the conduit, a lever connected to said valve for operating the same, and means permitting actuation of said lever while the electrical contacts are in operative condition.

5. In an internal combustion engine having a working cylinder and a carburetor, the combination of a blower for temporarily supplying a charge to the working cylinder, a pressure conduit connecting said blower to said carburetor and provided with an air port, a driving connection between said blower and the engine, a magneto-electric clutch interposed in said driving connection, a pair of electrical contacts for controlling said clutch, a valve for controlling the admission of air through the port in the conduit, a lever connected to said valve for operating the same, means permitting actuation of said lever while the electrical contacts are in operative condition, and means preventing interruption of the air supply to the working cylinder.

6. In an internal combustion engine, the combination comprising a working cylinder, a blower and a pressure conduit for supplying a charge to said working cylinder, a driving connection between said blower and the engine, a magneto-electric clutch interposed in said driving connection, a controlling mechanism for said clutch, a slidable valve slidable over and controlling an inlet opening in said pressure conduit, a common lever for both controlling means, a contact lever for electrically controlling said clutch, said contact lever being connected by spring means to a relatively fixed member as well as with said common lever.

7. In an internal combustion engine, the combination comprising a working cylinder, a compressor and a pressure conduit for supplying a charge to said cylinder, a driving connection between said compressor and the engine, a magneto-electric clutch interposed in said driving connection, a controlling mechanism for said clutch including an electric contact lever, a valve for controlling an inlet opening in said pressure conduit, a common lever for both controlling means, said contact lever having a lost motion connection with said common lever, so that there is no interruption of the air supply to the cylinder at the moment of changing over.

In testimony whereof I affix my signature.

FERDINAND PORSCHE.